(12) United States Patent
Hatano et al.

(10) Patent No.: US 8,303,047 B2
(45) Date of Patent: Nov. 6, 2012

(54) METHOD FOR PREVENTING DRAG IN VEHICULAR BRAKE SYSTEM

(75) Inventors: Kunimichi Hatano, Saitama (JP); Yuki Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 471 days.

(21) Appl. No.: 12/584,828

(22) Filed: Sep. 11, 2009

(65) Prior Publication Data

US 2010/0084914 A1    Apr. 8, 2010

(30) Foreign Application Priority Data

Oct. 8, 2008  (JP) ................................. 2008-261253
Mar. 16, 2009  (JP) .................................. 2009-63075

(51) Int. Cl.
*B60T 8/34* (2006.01)

(52) U.S. Cl. ............... 303/113.5; 303/113.1; 303/113.2; 303/113.4; 303/115.4; 303/116.1; 303/155; 303/9.63; 188/276

(58) Field of Classification Search ............... 303/113.5, 303/3, 16, 157
See application file for complete search history.

(56) References Cited

U.S. PATENT DOCUMENTS

| | | | | |
|---|---|---|---|---|
| 5,743,600 | A | * | 4/1998 | Yasuda et al. ............... 303/116.1 |
| 5,918,949 | A | * | 7/1999 | Volz et al. ................... 303/115.4 |
| 6,871,728 | B2 | | 3/2005 | Kamiya et al. |
| 7,093,911 | B2 | * | 8/2006 | Hool et al. ................... 303/113.5 |
| 2004/0201273 | A1 | * | 10/2004 | Kamiya et al. ............... 303/155 |
| 2008/0136251 | A1 | * | 6/2008 | Lee ............................ 303/113.2 |

FOREIGN PATENT DOCUMENTS

| | | | |
|---|---|---|---|
| JP | 1-182153 A | | 7/1989 |
| JP | 09-254775 | | 9/1997 |
| JP | 2001260832 A | * | 9/2001 |
| JP | 2003-154926 A | | 5/2003 |
| JP | 2004-306914 A | | 11/2004 |
| JP | 2005-238960 A | | 9/2005 |
| JP | 2006-240584(A) | | 9/2006 |

* cited by examiner

*Primary Examiner* — Robert A Siconolfi
*Assistant Examiner* — San Aung
(74) *Attorney, Agent, or Firm* — Carrier Blackman & Associates, P.C.; Joseph P. Carrier; William D. Blackman

(57) ABSTRACT

Systems and methods to prevent dragging of a fluid pressure type disk brake system are described herein. Brake fluid pressure generated by a master cylinder during a braking operation is transmitted to a wheel cylinder via a VSA system. The VSA system includes a low pressure accumulator and an out-valve disposed between the wheel cylinder and the low pressure accumulator. Temporarily opening the out-valve during a braking operation allows part of the brake fluid that would otherwise be supplied to the wheel cylinder to be supplied to the low pressure accumulator. After the braking operation by the driver is completed, brake fluid supplied to the wheel cylinder is returned to the master cylinder. Thus, a piston of the wheel cylinder is withdrawn by an extra amount corresponding to the amount of brake fluid supplied to the low pressure accumulator, thus reliably prevents disk pad dragging in the disk brake system.

10 Claims, 5 Drawing Sheets

WHEN BRAKE FLUID BEING DISCHARGED FROM LOW PRESSURE ACCUMULATOR

METHOD FOR PREVENTING DRAG IN VEHICULAR BRAKE SYSTEM

CROSS-REFERENCE TO RELATED APPLICATIONS

The present application claims priority under 35 USC §119 based on Japanese patent application No. 2008-261253, filed Oct. 8, 2008 and Japanese patent application No. 2009-63075 filed on Mar. 16, 2009. The subject matter of these priority documents is incorporated herein by reference.

BACKGROUND

1. Technical Field

This disclosure relates to a method for preventing break pad drag in a vehicular brake system that includes a brake fluid pressure generator for generating brake fluid pressure in response to a braking operation by a driver, a disk brake system for braking a wheel, and a brake fluid pressure controller disposed between the pressure generator and the disk brake system. In particular, the brake fluid pressure controller includes a low pressure accumulator and an on-off valve disposed between the disk brake system and the low pressure accumulator.

2. Description of the Related Art

Japanese Patent Application Laid-open No. 2006-240584 discloses an arrangement in which, with regard to a disk brake system that can also be used as a parking brake, a brake pad facing a brake disk can be moved back and forth by an electric motor and a ball screw mechanism, such that after braking is carried out by pressing the brake pad against the brake disk, dragging of the disk brake system is prevented by returning the brake pad to a position that maintains a predetermined pad clearance.

However, the above-mentioned conventional arrangement has a special structure in which a brake pad is driven back and forth by an electric motor and a ball screw mechanism. Such an arrangement is undesirable because it cannot be applied to a general disk brake system, in which a brake pad is pressed against a brake disk by driving a piston with brake fluid pressure generated from a master cylinder.

SUMMARY

This disclosure is presented in the light of the above-mentioned circumstances, and describes structures and methods to reliably prevent brake pad dragging in a fluid pressure type disk brake system.

A vehicular brake system includes a brake fluid pressure generator for generating brake fluid pressure in response to a braking operation by a driver, a disk brake system for braking a wheel, and a brake fluid pressure controller disposed between the fluid pressure generator and the disk brake system. The brake fluid pressure controller includes a low pressure accumulator and an out-valve disposed between the disk brake system and the low pressure accumulator. The controller prevents brake pad drag in the vehicular brake system by temporarily opening the out-valve during a braking operation and thereby discharging part of the brake fluid supplied to the disk brake system into the low pressure accumulator. The controller further returns the brake fluid that accumulated in the low pressure accumulator to the brake fluid pressure generator after the braking operation by the driver is completed.

Accordingly, brake fluid pressure generated by the brake fluid pressure generator in response to a braking operation by a driver is transmitted to the disk brake system via the brake fluid pressure controller, thus braking the wheel. Since the brake fluid pressure controller includes the low pressure accumulator and the out-valve disposed between the disk brake system and the low pressure accumulator, temporarily opening the out-valve during a braking operation allows part of the brake fluid that would otherwise be supplied to the disk brake system to be directed to the low pressure accumulator. After the braking operation is completed, brake fluid that has accumulated in the low pressure accumulator is returned to the brake fluid pressure generator. Because a portion of brake fluid has been removed from the disk brake system and temporarily stored in the low pressure accumulator, the piston of the disk brake system is withdrawn by an extra amount that corresponds to the amount of brake fluid held in the low pressure accumulator. Thus, withdrawing, or backing out, the piston by the additional amount prevents dragging of the disk brake system.

In particular, fluid of the disk brake system is discharged to the low pressure accumulator during an initial stage of the braking operation by the driver brake. Discharging brake fluid during the initial stage of the braking operation prevents sudden changes in braking operation force that could result if the fluid were to be discharged during a middle stage or final stage of a braking operation. Avoiding sudden changes in braking force may eliminate an uncomfortable sensation for the driver.

The brake fluid pressure controller further includes an in-valve disposed between the brake fluid pressure generator and the disk brake system and a suction valve disposed between the accumulator and the brake fluid pressure generator. Closing the in-valve while opening the suction valve allows brake fluid that has accumulated in the low pressure accumulator to be returned to the brake fluid pressure generator.

Moreover, because the in-valve is disposed between the brake fluid pressure generator and the disk brake system and the suction valve is disposed between the accumulator and the brake fluid pressure generator, closing the in-valve and opening the suction valve after the braking operation effectively returns brake fluid of the low pressure accumulator to the brake fluid pressure generator. Further, the out-valve is opened to thereby return brake fluid held in the low pressure accumulator to the brake fluid pressure generator. In particular, opening the out-valve after the braking operation effectively returns brake fluid held in the low pressure accumulator to the brake fluid pressure generator.

Here, a Vehicle Stability Assist (VSA) system 24 is adapted to act as the controller described herein.

The description provided herein, as well as other objects, characteristics and advantages of this disclosure, will be more easily understood with reference to the below-described drawings.

DETAILED DESCRIPTION

Figure 1:
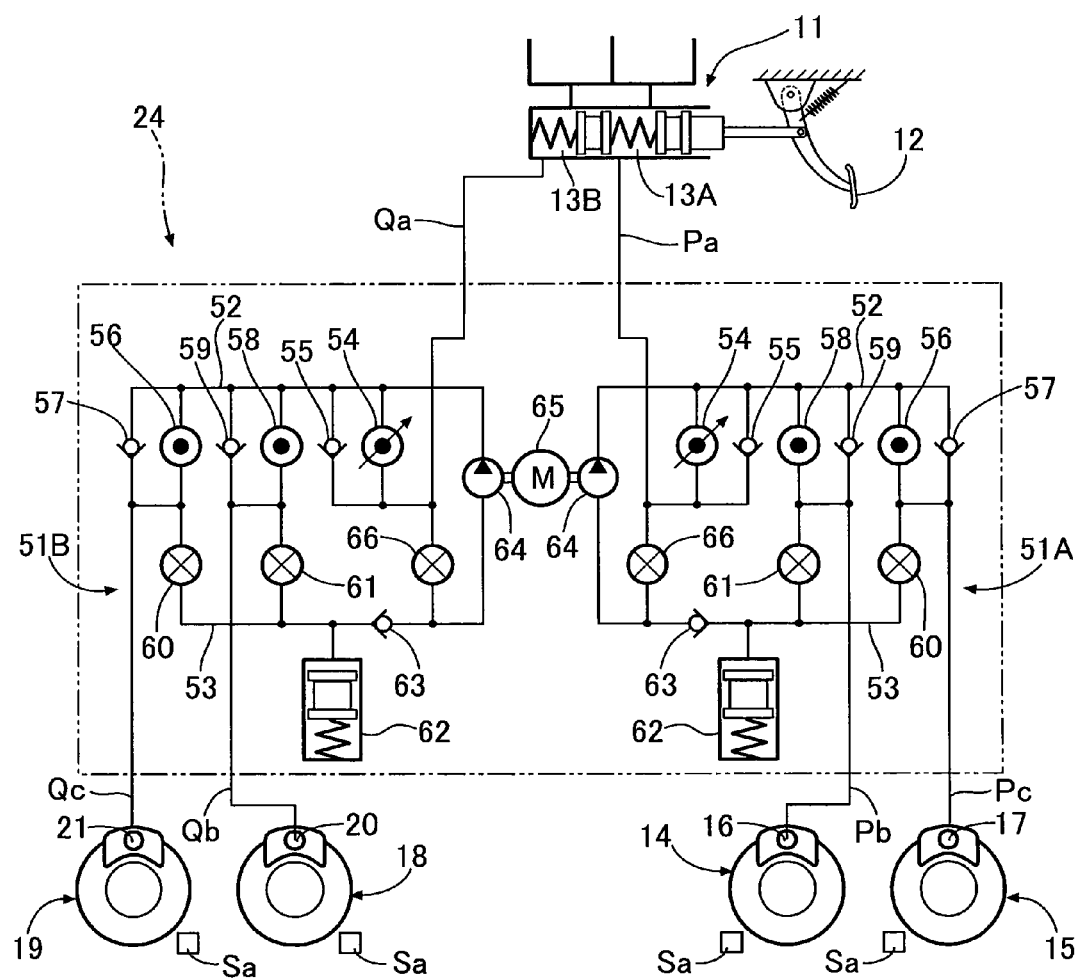
FIG. 1 is a schematic diagram of a fluid pressure vehicular brake system.

As shown in FIG. 1, a tandem master cylinder 11 has two first fluid pressure chambers 13A and 13B which output brake fluid pressure according to a force applied to a brake pedal 12 by a driver depressing the brake pedal 12. One of the fluid pressure chambers 13A is connected to wheel cylinders 16 and 17 of disc brake systems 14 and 15 for braking, for example, a left front wheel and a right rear wheel through fluid paths Pa, Pb and Pc (first line). The other fluid pressure chamber 13B is connected to wheel cylinders 20 and 21 of disc brake systems 18 and 19 for braking, for example, a right front wheel and a left rear wheel through fluid paths Qa, Qb and Qc (second line).

Vehicle Stability Assist (VSA) system 24 is provided between the fluid paths Pa, Qa and the fluid paths Pb, Pc; Qb, Qc. Any existing VSA that can be adapted with the structures and functions described herein may be suitable for use as VSA 24. A first brake actuator 51A for controlling a first line of the disk brake systems 14 and 15 of the front left wheel and rear right wheel and a second brake actuator 51B for controlling a second line of the disk brake systems 18 and 19 of the front right wheel and rear left wheel have the same structure. Accordingly, the first brake actuator 51A will be explained below as being representative of both actuators 51A, 51B.

The first brake actuator 51A is disposed between the fluid path Pa communicating with fluid pressure chamber 13A of the master cylinder 11 and fluid paths Pb and Pc communicating respectively with wheel cylinders 16 and 17 of the front left wheel and the rear right wheel positioned on the downstream side.

The first brake actuator 51A includes a fluid path 52 and a fluid path 53 that are common to the wheel cylinders 16 and 17 of the front left wheel and the rear right wheel, and further includes a regulator valve 54, which is a selectively openable solenoid valve that is normally open, disposed between the fluid path Pa and the fluid path 52, a check valve 55 that is disposed in parallel to the regulator valve 54 and allows the flow of brake fluid from the fluid path Pa side to the fluid path 52 side, an in-valve 56, which is a normally-open solenoid valve disposed between the fluid path 52 and the fluid path Pc, a check valve 57 that is disposed in parallel to the in-valve 56 and allows the flow of brake fluid from the fluid path Pc side to the fluid path 52 side, an in-valve 58, which is a normally-open solenoid valve disposed between the fluid path 52 and the fluid path Pb, a check valve 59 that is disposed in parallel to the in-valve 58 and allows the flow of brake fluid from the fluid path Pb side to the fluid path 52 side, an out-valve 60, which is a normally-closed solenoid valve disposed between the fluid path Pc and the fluid path 53, an out-valve 61, which is a normally-closed solenoid valve disposed between the fluid path Pb and the fluid path 53, a low pressure accumulator 62 connected to the fluid path 53, a check valve 63 that is disposed between the fluid path 53 and the fluid path 52 and allows the flow of brake fluid from the fluid path 53 side to the fluid path 52 side, a pump 64 that is disposed between the check valve 63 and the fluid path 52 and supplies brake fluid from the fluid path 53 side to the fluid path 52 side, an electric motor 65 for driving the pump 64, and a suction valve 66, which is a normally-closed solenoid valve disposed between the fluid path Pa at a position midway between the check valve 63 and the pump 64.

The electric motor 65 is shared by the pumps 64 of the first and second brake actuators 51A and 51B. However, in another exemplary approach (not shown), but it is also possible to provide a distinct electric motor each exclusively used for one of the pumps 64.

Next, operations of the exemplary approach of this disclosure having the above arrangement will be described.

When the driver depresses the brake pedal 12 in order to carry out braking and the master cylinder 11 generates brake fluid pressure, the electric motor 65 of the VSA system 24 stops operating, the regulator valves 54 are de-energized and opened, the suction valves 66 are de-energized and closed, the in-valves 56, 58 are de-energized and opened, and the out-valves 60, 61 are de-energized and closed. Therefore, brake fluid pressure outputted from the pair of fluid pressure chambers 13A and 13B of the master cylinder 11 is supplied from the regulator valves 54 to the wheel cylinders 16, 17, 20, 21 via the in-valves 56, 58, which are in a valve open state, thus braking the four wheels.

When the driver is not depressing the brake pedal 12, if the pumps 64 are driven by the electric motor 65 in a state in which the suction valves 66 are energized and opened, brake fluid that has been sucked in from the master cylinder 11 side via the suction valves 66 and pressurized by the pumps 64 is supplied to the regulator valves 54 and the in-valves 56, 58. Therefore, by energizing the regulator valves 54 and adjusting the degree of opening so as to regulate the brake fluid pressure of the fluid paths 52 and by selectively supplying brake fluid pressure to the wheel cylinders 16, 17, 20, 21 via the in-valves 56, 58, which are opened at a predetermined degree of opening by energization, it is possible to control the braking forces for the four wheels individually even in a state in which the driver is not depressing the brake pedal 12.

Therefore, it is possible by individually controlling the braking forces for the four wheels by way of the first and second brake actuators 51A and 51B to increase the braking forces for the inner turning wheels to thus enhance turning performance or to increase the braking forces for the outer turning wheels to thus enhance straight-line stability.

Furthermore, when the driver suddenly depresses the brake pedal 12 in order to avoid a collision, the brake fluid pressure generated by the master cylinder 11 is further increased by the pumps 64, which maximizes the braking force is generated in the wheel cylinders 16, 17, 20, 21 by way of the increased brake fluid pressure. That is, when the pumps 64 are driven by the electric motor 65 in a state in which the regulator valves 54 are energized and closed and the suction valves 66 are energized and opened, the brake fluid pressure generated by the master cylinder 11 is sucked in by the pumps 64 via the suction valves 66, further pressurized there, and supplied to the wheel cylinders 16, 17, 20, 21 via the in-valves 56, 58, thus assisting the braking operation by the driver and thereby generating a large braking force for avoiding a collision.

Furthermore, if a tendency to lock is detected based on output from wheel speed sensors Sa when, for example, the front left wheel goes onto a low coefficient of friction road during braking by the driver depressing the brake pedal 12, one in-valve 58 of the first brake actuator 51A is energized and closed and one out-valve 61 is energized and opened to thus release the brake fluid pressure of the wheel cylinder 16 of the front left wheel to the low pressure accumulator 62 so as to decrease it to a predetermined pressure. Subsequently, the out-valve 61 is de-energized and closed to thus maintain the brake fluid pressure of the wheel cylinder 16 of the front left wheel. As a result, the tendency of the wheel cylinder 16 to lock starts to disappear. Once unlocked, the in-valve 58 is de-energized and opened, and brake fluid pressure from one fluid pressure chamber 13A of the master cylinder 11 is supplied to the wheel cylinder 16 of the front left wheel until the pressure is increased to a predetermined pressure, thus increasing the braking force.

If the front left wheel tends to lock again due to this pressure increase, ABS (Antilock Brake System) control in which braking distance is minimized by suppressing locking of the front left wheel can be carried out by repeating the decreasing pressure→maintaining→increasing pressure.

ABS control when the wheel cylinder 16 of the front left wheel tends to lock is explained above, but ABS control when the wheel cylinder 17 of the rear right wheel, the wheel cylinder 20 of the front right wheel, and the wheel cylinder 21 of the rear left wheel tend to lock can be carried out in the same manner.

Now, if no pad clearance is provided between the brake pad and the brake disk of the disk brake systems 14, 15, 18, 19, even when the disk brake systems 14, 15, 18, 19 are not operated, the brake pad tends to drag against the brake disk. Brake pad drag is undesirable because of the resulting accelerated brake pad ware and degraded fuel economy.

Figure 2:
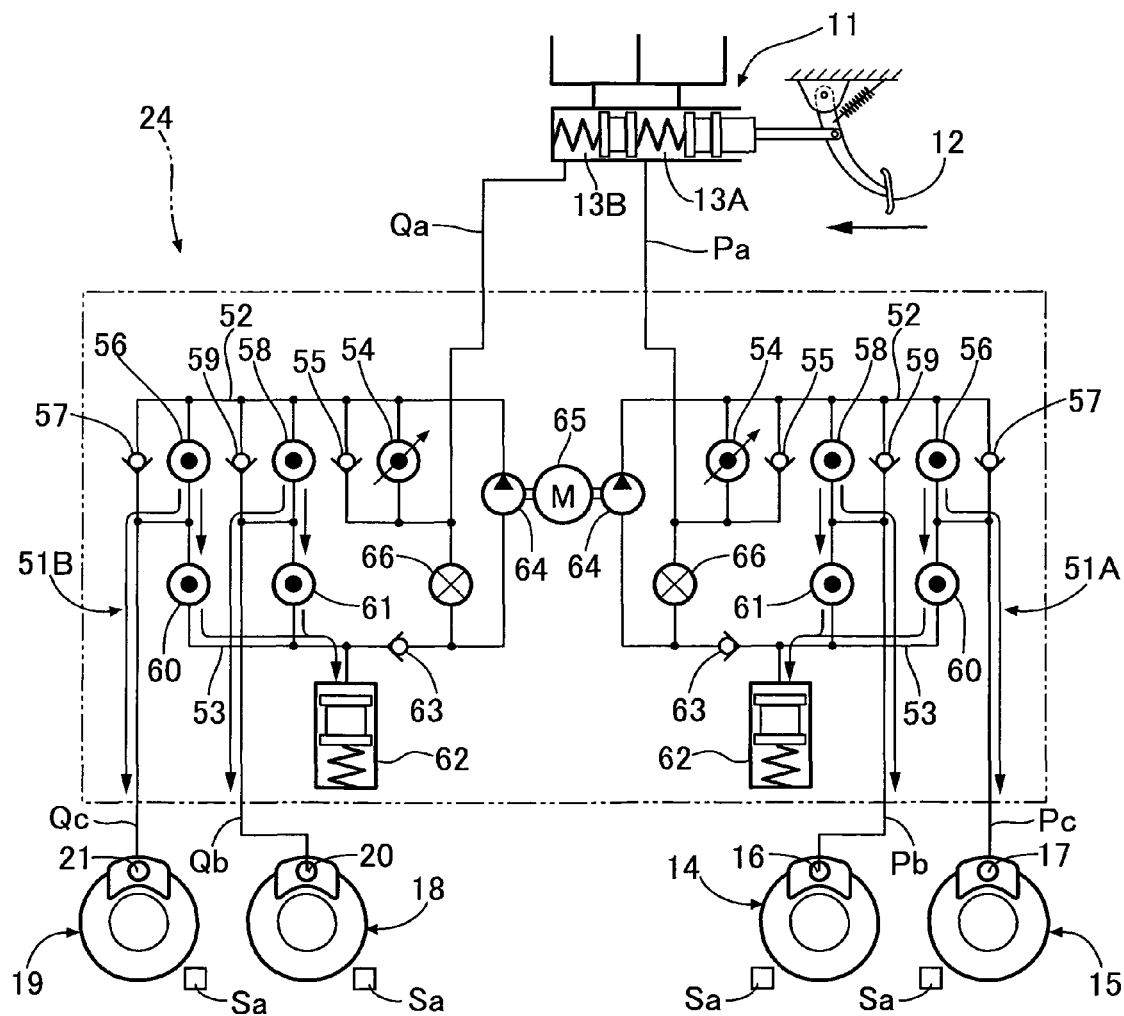
FIG. 2 is a diagram showing the operation in the initial stage of depressing a brake pedal.

In this exemplary approach, when a brake switch (not illustrated) detects the initial stage of a braking operation by the driver, that is, the driver depressing the brake pedal 12, as shown in FIG. 2, the out-valves 60, 61 of the VSA system 24 are energized and opened for a predetermined time. As a result, when brake fluid supplied from the pair of fluid pressure chambers 13A and 13B of the master cylinder 11 is supplied from the regulator valves 54 to the wheel cylinders 16, 17, 20, 21 via the in-valves 56, 58 in an open state, part of the brake fluid flows through the out-valves 60, 61 and is absorbed by the low pressure accumulators 62.

Since the above-mentioned temporary opening of the out-valves 60, 61 is carried out at the same time as depression of the brake pedal 12, a sudden change of the pedal reaction force, etc. does not occur, and there is no adverse influence on pedal feel. Moreover, since the amount of time that the out-valves 60, 61 remain open is very short, the risk of degrading the brake system responsiveness and the generated braking force is minimized.

Figure 3:
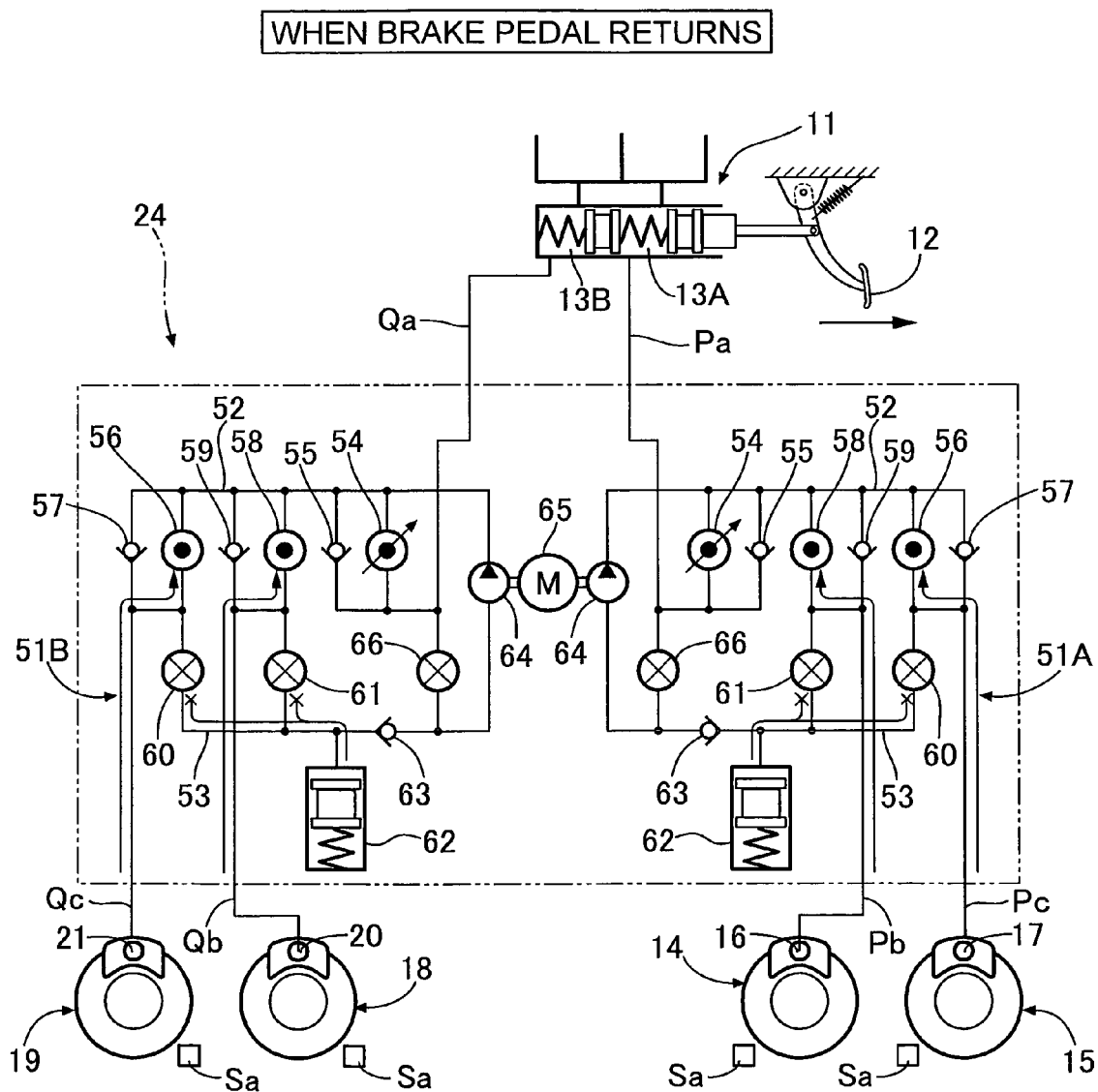
FIG. 3 is a diagram showing the operation when the brake pedal returns.

As shown in FIG. 3, when braking is completed and the driver allows the brake pedal 12 to return, the out-valves 60, 61 will already be in a closed state. Accordingly, brake fluid that has been absorbed by the low pressure accumulators 62 is not returned to the master cylinder 11, and only the brake fluid that has been supplied to the wheel cylinders 16, 17, 20, 21 is returned to the master cylinder 11. Compared with the amount of brake fluid supplied to the wheel cylinders 16, 17, 20, 21 when the brake pedal 12 is being depressed, the amount of brake fluid that is discharged from the wheel cylinders 16, 17, 20, 21 when the brake pedal 12 is returned is increased by an amount corresponding to the amount of brake fluid absorbed by the low pressure accumulators 62. Thus, the pistons of the disk brake systems 14, 15, 18, 19 are pulled back by an extra portion that corresponds to the amount of brake fluid held in the low pressure accumulators 62. Accordingly, withdrawing the pistons 14, 15, 18, 19 by this extra amount ensures that there is a pad clearance between the brake pad and the brake disk, which thereby reliably prevents the occurrence of dragging.

Figure 4:
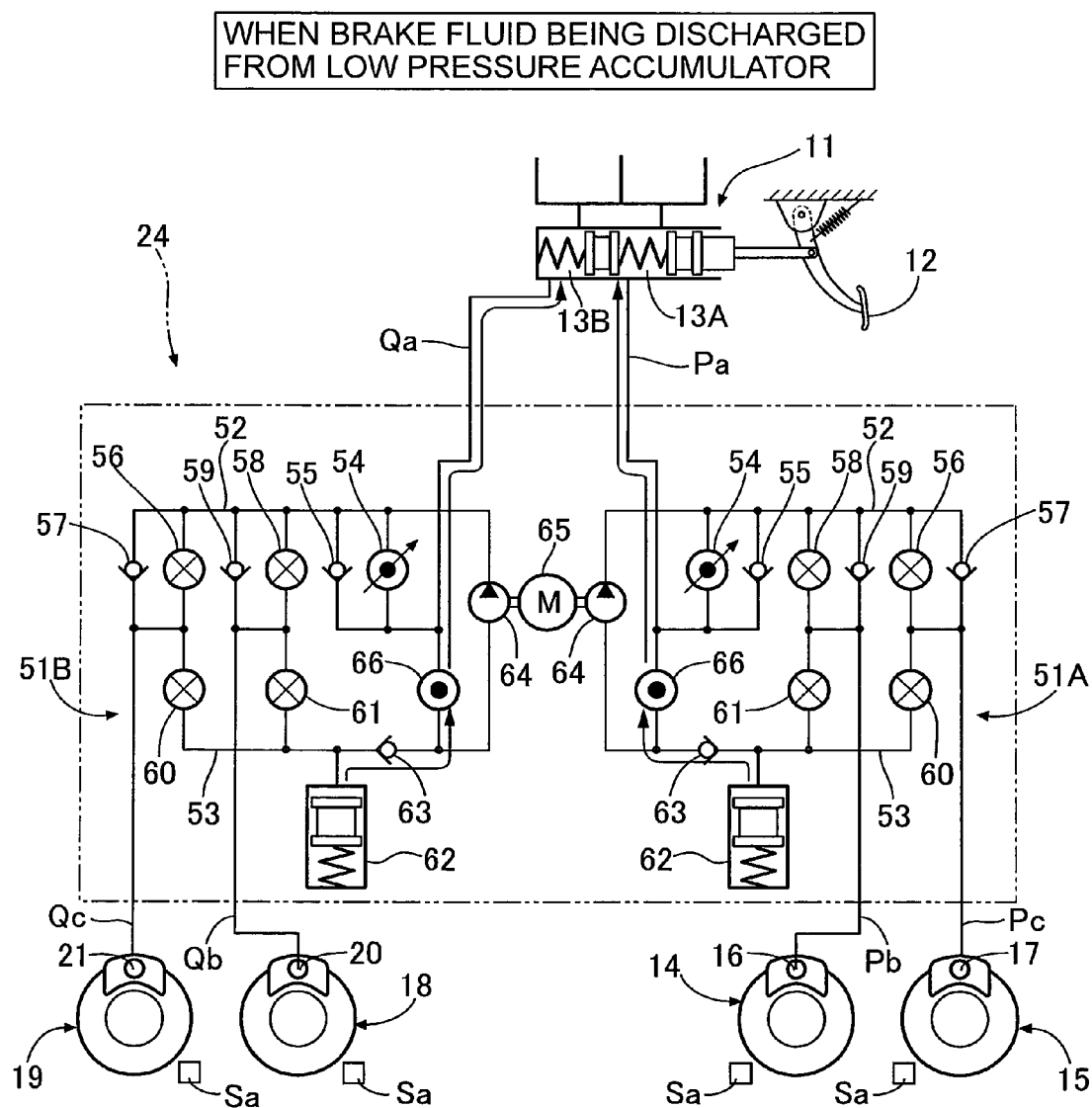
FIG. 4 is a diagram showing the operation of discharging the low pressure accumulator.

Brake fluid that has been absorbed by the low pressure accumulators 62 by way of the temporary opening the out-valves 60, 61 in the initial stage of braking can be returned to the two fluid pressure chambers 13A and 13B of the master cylinder 11 as shown in FIG. 4 by closing the in-valves 56, 58 and opening the suction valves 66 and 66 after braking is completed.

As described above, and without adding any special arrangement to the existing brake system, by controlling just the opening and closing of the out-valves 60, 61 of the VSA system 24, dragging of the disk brake systems 14, 15, 18, 19 can reliably be prevented.

Figure 5:
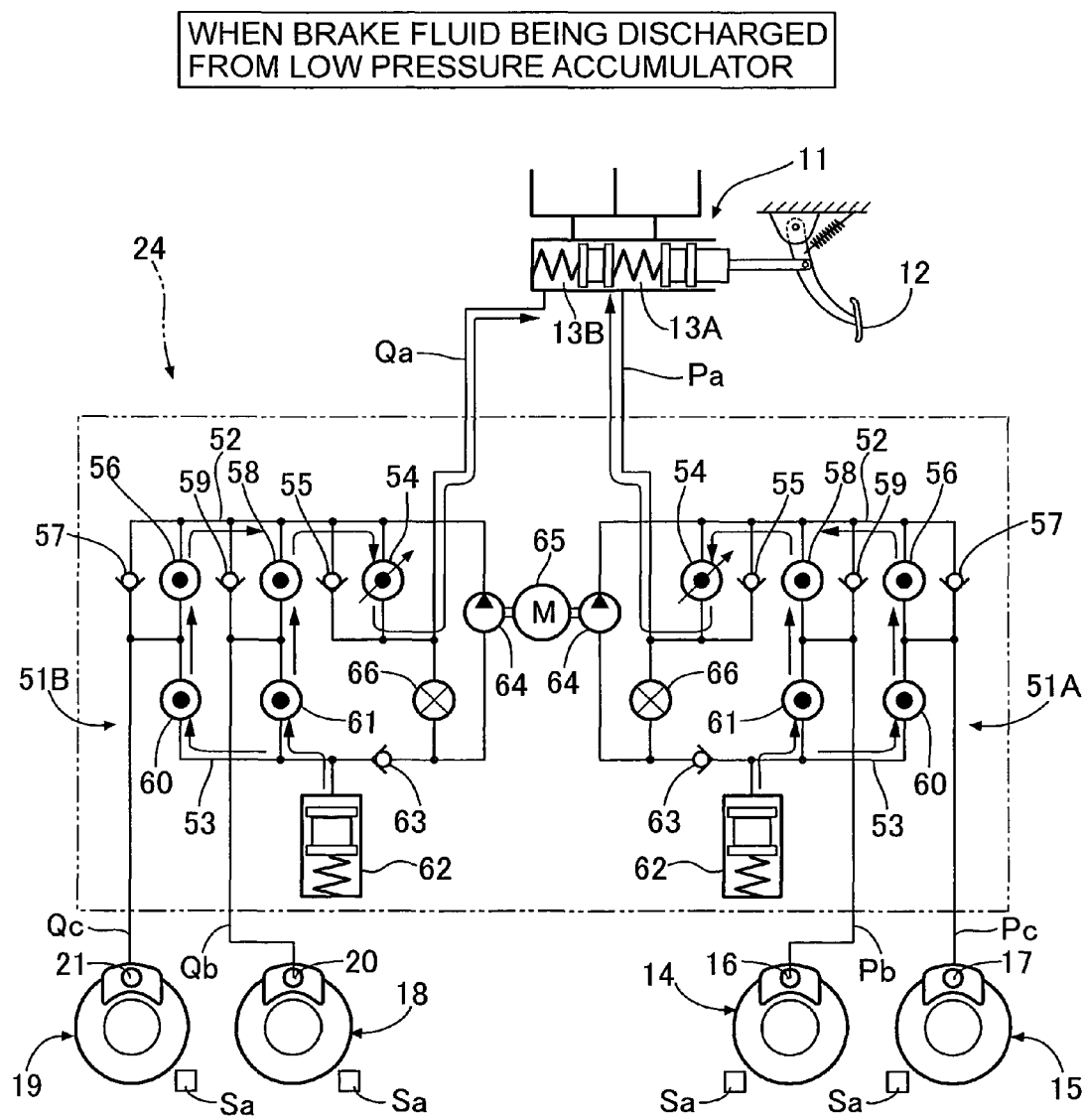
FIG. 5 is a diagram showing another exemplary approach to discharging the low pressure accumulator.

Referring now to FIG. 5, another exemplary approach for returning brake fluid from the low pressure accumulators 62 is described. In this approach, brake fluid of low pressure accumulators 62 is returned to the fluid pressure chambers 13A and 13B of a master cylinder 11 via regulator valves 54 as a result of opening out-valves 60, 61. In all other respects, the braking and brake fluid restoration steps preceed in the same manner described above. However, in this arrangement, only one of the two out-valves 60 and 61 of each line needs to be opened. Moreover, either of the two out-valves 60 and 61 may be opened. This approach achieves the same results as the approach discussed above.

Certain exemplary approaches to achieve the ends of this disclosure are explained above. However, it is to be understood that this disclosure may be modified in a variety of ways as long as the modifications do not depart from the overall scope of this disclosure.

For example, the brake fluid pressure controller of this disclosure is not limited to the VSA system 24 of the exemplary approaches described herein, and may be any suitable VSA as long as it has an arrangement corresponding to the low pressure accumulator 62 and the out-valves 60 and 61.

Furthermore, in the exemplary approaches described herein, braking is carried out by way of brake fluid pressure generated by the master cylinder 11. However, in other exemplary approaches (not shown) braking may be carried out by way of brake fluid pressure generated by electric braking force generator such as a slave cylinder that is operated by an electric signal based on a braking operation by a driver.

What is claimed is:

1. A fluid pressure-type vehicular brake system, comprising:
    a brake fluid pressure generator for generating brake fluid pressure in response to a braking operation;
    a disk brake system for braking a wheel; and
    a brake fluid pressure controller disposed between the pressure generator and the disk brake system, including a low pressure accumulator and an out-valve disposed between the disk brake system and the low pressure accumulator, wherein the controller is configured to prevent drag in the vehicular brake system by:
    temporarily opening the out-valve during an initial stage of the braking operation so as to discharge, into the low pressure accumulator, part of a first amount of brake fluid that would otherwise be supplied from the brake fluid pressure generator to the disk brake system such that entire first amount does not reach the disk brake system; and
    returning the first amount of brake fluid back from the disc brake system to the brake fluid pressure generator after the braking operation.

2. The system according to claim 1, wherein the controller is further configured to retain the part of the first amount within the low pressure accumulator while returning the first amount of brake fluid back to the fluid pressure generator, thereby withdrawing a piston of the disk brake system to a predetermined clearance distance.

3. The system according to claim 1, wherein the brake fluid pressure controller further includes:
    an in-valve disposed between the brake fluid pressure generator and the disk brake system; and
    a suction valve disposed between the low pressure accumulator and the brake fluid pressure generator, and wherein the controller is further configured to return the part of the first amount of brake fluid held in the low pressure accumulator to the brake fluid pressure generator after completing the return of the first amount to the fluid pressure generator by closing the in-valve and opening the suction valve.

4. The system according to claim 1, wherein the controller is further configured to return the part of the first amount of brake fluid held in the low pressure accumulator to the brake fluid pressure generator after completing the return of the first amount to the fluid pressure generator by opening the out-valve.

5. The system according to claim 1, further comprising a vehicle stability assist (VSA) system, and wherein the VSA serves as the controller.

6. A brake controller-implemented method for preventing disk pad drag in a fluid pressure-type vehicular brake system, comprising:
   detecting a braking operation;
   generating brake fluid pressure via a brake fluid pressure generator in response to the braking operation;
   directing a first amount of brake fluid from the pressure generator to a disk brake system for braking a wheel;
   during an initial stage of the braking operation, redirecting a portion of the first amount of brake fluid that would otherwise reach the disk brake system to a low pressure accumulator such that only a second amount of brake fluid is supplied to the disk brake system, wherein the second amount corresponds to the first amount as reduced by the portion redirected to the low pressure accumulator; and
   returning the first amount of brake fluid from the disc brake system to the pressure generator after the completion of the braking operation.

7. The method according to claim 6, further comprising:
   engaging a piston of the disk brake system with the second amount of brake fluid;
   retaining the portion of brake fluid in the low pressure accumulator while returning the first amount of brake fluid from the disk brake system to the pressure generator; and
   withdrawing the piston to a predetermined clearance distance corresponding to the first amount of brake fluid.

8. The method according to claim 6, wherein the redirecting includes temporarily opening an out-valve disposed between the low pressure accumulator and the disk brake system.

9. The system according to claim 6, further comprising:
   emptying, after completing the returning of the first amount to the pressure generator, the portion of brake fluid held in the low pressure accumulator to the brake fluid pressure generator, including:
   closing an in-valve disposed between the brake fluid pressure generator and the disk brake system; and
   opening a suction valve disposed between the low pressure accumulator and the brake fluid pressure generator.

10. The method according to claim 6, further comprising emptying, after completing the returning of the first amount to the pressure generator, the portion of brake fluid held in the low pressure accumulator to the brake fluid pressure generator by opening an out-valve disposed between the low pressure accumulator and the disk brake system.

* * * * *